(12) United States Patent
Chen et al.

(10) Patent No.: US 12,557,047 B2
(45) Date of Patent: Feb. 17, 2026

(54) TIME SYNCHRONIZATION METHOD, FIRST NODE, SECOND NODE, AND NETWORK

(71) Applicant: ZTE CORPORATION, Guangdong (CN)

(72) Inventors: Guang Chen, Guangdong (CN); Lei Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 344 days.

(21) Appl. No.: 18/032,837

(22) PCT Filed: Oct. 18, 2021

(86) PCT No.: PCT/CN2021/124361
§ 371 (c)(1),
(2) Date: Apr. 20, 2023

(87) PCT Pub. No.: WO2022/083537
PCT Pub. Date: Apr. 28, 2022

(65) Prior Publication Data
US 2023/0388949 A1    Nov. 30, 2023

(30) Foreign Application Priority Data

Oct. 21, 2020    (CN) .......................... 202011132601.X

(51) Int. Cl.
*H04W 56/00* (2009.01)
*H04J 3/06* (2006.01)

(52) U.S. Cl.
CPC ....... *H04W 56/0015* (2013.01); *H04J 3/0658* (2013.01)

(58) Field of Classification Search
CPC ...... H04J 3/0641; H04J 3/0644; H04J 3/0658; H04J 3/0667; H04J 3/0679; H04W 56/0015

(Continued)

(56) References Cited

U.S. PATENT DOCUMENTS

| 2011/0158120 A1 | 6/2011 | Hamasaki et al. |
| 2013/0227008 A1* | 8/2013 | Yang ..................... H04J 3/0667 709/204 |

(Continued)

FOREIGN PATENT DOCUMENTS

| CN | 1187272 A | 7/1998 |
| CN | 102130736 A | 7/2011 |

(Continued)

OTHER PUBLICATIONS

China Patent Office, the first Office action dated Dec. 24, 2024, for corresponding CN application No. 202011132601.X.

(Continued)

*Primary Examiner* — Robert J Lopata
(74) *Attorney, Agent, or Firm* — Li & Cai Intellectual Property (USA) Office

(57) ABSTRACT

Embodiments of the present disclosure relate to the technical field of communications, and provide a time synchronization method applied to a first node provided with at least one output port connected to an input port of a second node via an out-of-band synchronization link and at least one additional output port connected to a third node via an in-band synchronization link, and the method includes: sending out-of-band time synchronization information to the second node via the out-of-band synchronization link, with the out-of-band time synchronization information including a grandmaster clock identity of the first node. The embodiments of the present disclosure further provide a time (Continued)

out-of-band time synchronization information is sent to the second node via the out-of-band synchronization link, with the out-of-band time synchronization information including a grandmaster clock identity of the first node ⟶ S101 synchronization method applied to a second node, a first node, a second node, and a network.

9 Claims, 2 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2013/0227172 A1* | 8/2013 | Zheng | H04J 3/0667 709/248 |
| 2013/0308712 A1 | 11/2013 | Xu et al. | |
| 2014/0348181 A1 | 11/2014 | Chandra et al. | |
| 2015/0188691 A1* | 7/2015 | Mizuguchi | H04L 7/0012 375/355 |
| 2016/0013876 A1* | 1/2016 | Zhang | H04J 3/0667 370/350 |
| 2018/0323890 A1* | 11/2018 | Zhang | H04J 3/0658 |
| 2019/0089472 A1 | 3/2019 | Zhang et al. | |
| 2022/0393784 A1* | 12/2022 | Li | H04W 56/005 |
| 2023/0262625 A1* | 8/2023 | Lyu | H04W 56/001 370/350 |

FOREIGN PATENT DOCUMENTS

| | | |
|---|---|---|
| CN | 102208958 A | 10/2011 |
| CN | 102820941 A | 12/2012 |
| CN | 106301647 A | 1/2017 |
| CN | 109194435 A | 1/2019 |
| EP | 2941065 A1 | 11/2015 |
| JP | 2011139198 A | 7/2011 |
| WO | WO 2009109088 A1 | 9/2009 |

OTHER PUBLICATIONS

European Patent Office, the Extended European Search Report dated Oct. 1, 2024, for corresponding EP application No. 21881954.8.
Tim Frost Calnex Solutions Ltd UK, "Draft_Revised_Recommendation G.8271-latest Draft", ITU-T Draft, Nov. 19, 2015.
WIPO, International Search Report issued on Jan. 7, 2022.

* cited by examiner out-of-band time synchronization information is sent to the second node via the out-of-band synchronization link, with the out-of-band time synchronization information including a grandmaster clock identity of the first node — S101

FIG. 1 out-of-band time synchronization information sent by the first node and in-band time synchronization information sent by at least one third node are received, with the out-of-band time synchronization information including a grandmaster clock identity of the first node — S201 in a case where the grandmaster clock identity of the first node is an identity of the second node, one of all third nodes is determined as a preferred node according to the in-band time synchronization information, and the time of the second node is synchronized with the time of the preferred node — S202 in a case where the grandmaster clock identity of the first node is not the identity of the second node, one node among the first node and all the third nodes are determined as a preferred node according to the out-of-band time synchronization information and the in-band time synchronization information, and the time of the second node is synchronized with the time of the preferred node — S203

FIG. 2

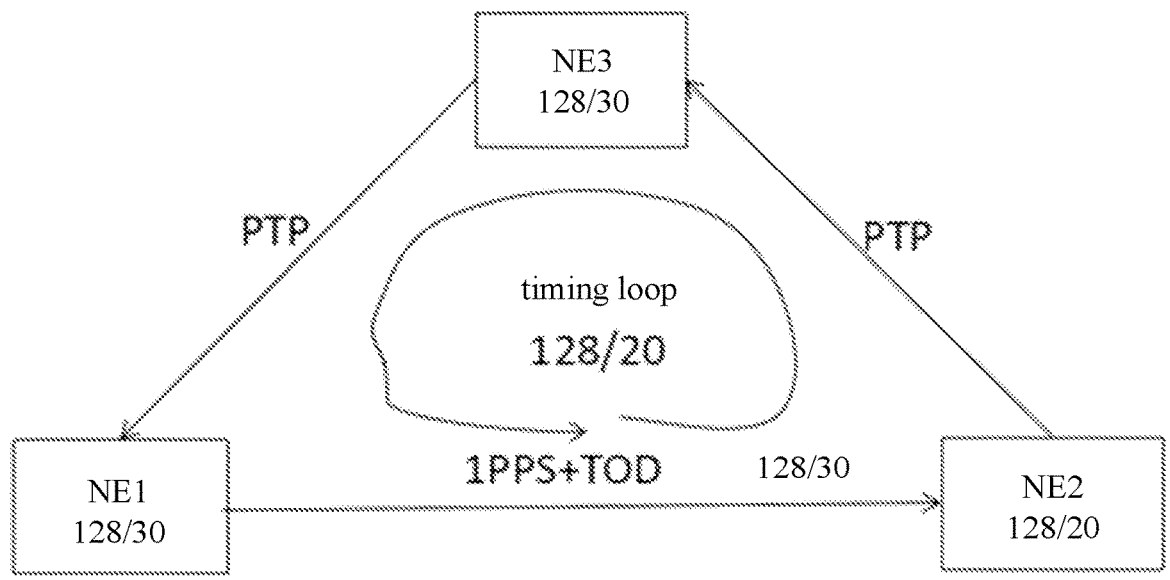

FIG. 3

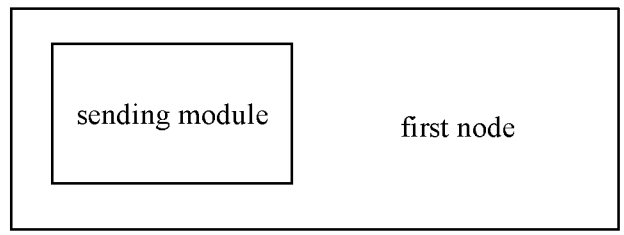
FIG. 4
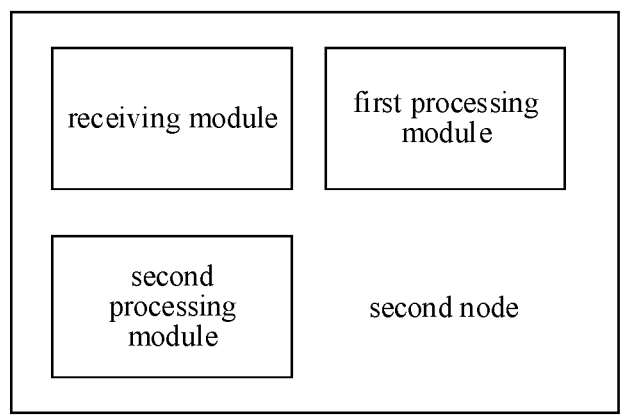
FIG. 5
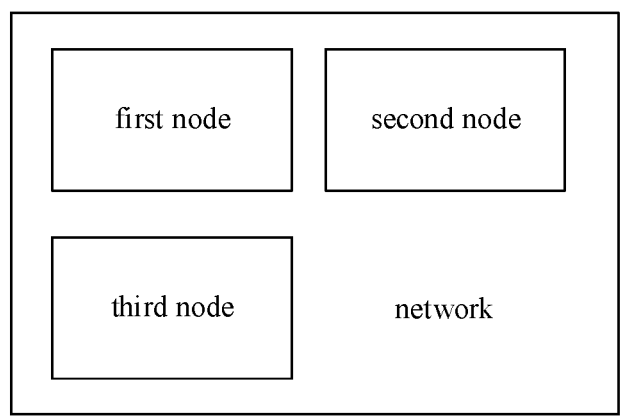
FIG. 6
FIG. 7

TIME SYNCHRONIZATION METHOD, FIRST NODE, SECOND NODE, AND NETWORK

CROSS-REFERENCE TO RELATED APPLICATIONS

The present disclosure is a National Phase Application filed under 35 U.S.C. 371 as a national stage of PCT/CN2021/124361, filed on Oct. 18, 2021, an application claiming the priority to Chinese Patent Application No. 202011132601.X filed with the CNIPA on Oct. 21, 2020, the entire contents of which are incorporated herein by reference.

TECHNICAL FIELD

Embodiments of the present disclosure relate to the technical field of communications.

BACKGROUND

With the development of communication technologies, especially the 5G technology (5th Generation Mobile Communication Technology), requirements for time synchronization among network devices in a network become higher and higher.

There are two time synchronization modes, namely an in-band synchronization mode and an out-of-band synchronization mode. As the network becomes more and more complicated, a network device capable of performing time synchronization both in the in-band mode and in the out-of-band mode exists in the network, which can easily cause existence of a Timing Loop in the network.

SUMMARY

In a first aspect, the embodiments of the present disclosure provide a time synchronization method applied to a first node provided with at least one output port connected to an input port of a second node via an out-of-band synchronization link and at least one additional output port connected to a third node via an in-band synchronization link, including: sending out-of-band time synchronization information to the second node via the out-of-band synchronization link, with the out-of-band time synchronization information including a grandmaster clock identity of the first node.

In a second aspect, the embodiments of the present disclosure provide a time synchronization method applied to a second node provided with at least one input port connected to an output port of a first node via an out-of-band synchronization link and at least one additional input port connected to a third node via an in-band synchronization link, including: receiving out-of-band time synchronization information sent by the first node and in-band time synchronization information sent by at least one third node, with the out-of-band time synchronization information including a grandmaster clock identity of the first node; in response to a case where the grandmaster clock identity of the first node is an identity of the second node, determining one of all third nodes as a preferred node according to the in-band time synchronization information, and synchronizing time of the second node with time of the preferred node; and in response to a case where the grandmaster clock identity of the first node is not the identity of the second node, determining one node among the first node and all the third nodes as a preferred node according to the out-of-band time synchronization information and the in-band time synchronization information, and synchronizing the time of the second node with time of the preferred node.

In a third aspect, the embodiments of the present disclosure provide a first node provided with at least one output port connected to an input port of a second node via an out-of-band synchronization link and at least one additional output port connected to a third node via an in-band synchronization link, including: a sending module configured to send out-of-band time synchronization information to the second node via the out-of-band synchronization link; and the out-of-band time synchronization information includes a grandmaster clock identity of the first node.

In a fourth aspect, the embodiments of the present disclosure provide a second node provided with at least one input port connected to an output port of a first node via an out-of-band synchronization link and at least one additional input port connected to a third node via an in-band synchronization link, including: a receiving module configured to receive out-of-band time synchronization information sent by the first node and in-band time synchronization information sent by at least one third node, with the out-of-band time synchronization information including a grandmaster clock identity of the first node; a first processing module configured to determine, in response to a case where the grandmaster clock identity of the first node is an identity of the second node, one of all third nodes as a preferred node according to the in-band time synchronization information, and synchronize time of the second node with time of the preferred node; and a second processing module configured to determine, in response to a case where the grandmaster clock identity of the first node is not the identity of the second node, one node among the first node and all the third nodes as a preferred node according to the out-of-band time synchronization information and the in-band time synchronization information, and synchronize the time of the second node with time of the preferred node.

In a fifth aspect, the embodiments of the present disclosure provide a network, including: at least one first node; at least one second node; and at least one third node. The first node is provided with at least one output port connected to an input port of the second node via an out-of-band synchronization link; the first node is further provided with at least one additional output port connected to the third node via an in-band synchronization link; and the second node is provided with at least one additional input port connected to the third node via an in-band synchronization link.

BRIEF DESCRIPTION OF DRAWINGS

FIG. 1 is a flowchart illustrating a time synchronization method applied to a first node according to the embodiments of the present disclosure.

FIG. 2 is a flowchart illustrating a time synchronization method applied to a second node according to the embodiments of the present disclosure.

FIG. 3 is a schematic diagram illustrating a relationship between network devices in a network.

FIG. 4 is a schematic diagram of a structure of a Time of Day (TOD) frame of a 1 Pulse Per Second (PPS)+TOD packet.

FIG. 5 is a block diagram of a first node according to the embodiments of the present disclosure.

FIG. 6 is a block diagram of a second node according to the embodiments of the present disclosure.

FIG. 7 is a block diagram of a network according to the embodiments of the present disclosure.

DETAIL DESCRIPTION OF EMBODIMENTS

In order to enable those of ordinary skill in the art to better understand the technical solutions of the embodiments of the present disclosure, the time synchronization methods, the first node, the second node, and the network provided by the embodiments of the present disclosure are described in detail below with reference to the drawings.

The embodiments of the present disclosure will be described more fully below with reference to the drawings, but the embodiments illustrated may be embodied in different forms, and should not be interpreted as being limited to the embodiments described herein. Rather, the embodiments are provided to make the present disclosure thorough and complete, and are intended to enable those of ordinary skill in the art to fully understand the scope of the present disclosure.

The drawings for the embodiments of the present disclosure are intended to provide a further understanding of the embodiments of the present disclosure and constitute a part of the specification. Together with the embodiments of the present disclosure, the drawings are used to explain the present disclosure, but do not constitute any limitation to the present disclosure. The above and other features and advantages will become more apparent to those of ordinary skill in the art from the description of specific embodiments with reference to the drawings.

The embodiments of the present disclosure can be described with reference to plans and/or cross-sectional views with the aid of idealized schematic diagrams of the present disclosure. Accordingly, the exemplary drawings may be modified according to manufacturing techniques and/or tolerances.

All the embodiments of the present disclosure and the features therein may be combined with each other if no conflict is incurred.

The terms used herein are merely used to describe specific embodiments, and are not intended to limit the present disclosure. The term "and/or" used herein includes one associated listed item or any and all combinations of more than one associated listed items. The terms "one" and "the" used herein which indicate a singular form are intended to include a plural form, unless expressly stated in the context. The terms "comprise" and "be made of" used herein indicate the presence of the described features, integers, operations, elements and/or components, but do not exclude the presence or addition of one or more other features, integers, operations, elements, components and/or combinations thereof.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

The embodiments of the present disclosure are not limited to those illustrated by the drawings, but include modifications to configuration formed based on a manufacturing process. Thus, regions shown in the drawings are illustrative, and shapes of the regions shown in the drawings illustrate specific shapes of regions of elements, but are not intended to make limitations.

In some related techniques, with reference to FIG. 3, a network is simultaneously provided with a plurality of network devices, that is, a network device (or referred to as a node) 1 (NE1 in FIG. 3), a network device 2 (NE2 in FIG. 3), and a network device 3 (NE3 in FIG. 3). An out-of-band synchronization link exists between NE1 and NE2, NE1 serves as an input end of the out-of-band synchronization link, and NE2 serves as an output end of the out-of-band synchronization link; and in-band synchronization links exist between the other neighboring network devices (that is, between NE1 and NE3 and between NE2 and NE3).

An in-band synchronization link refers to a link built between network devices in a network for performing time synchronization in the in-band mode, ports at two ends of the link are generally Ethernet ports, and the link runs the IEEE1588 protocol (Precision Clock Synchronization Protocol for Networked Measurement and Control Systems). For example, the link is a Precision Time Protocol (PTP) link.

An out-of-band synchronization link refers to a link built between the network devices in the network for performing time synchronization in the out-of-band mode, ports at two ends of the link are generally Global Positioning System (GPS) interfaces, and the link runs protocols such as National Marine Electronics Association (NEMA), UBX (a protocol packet developed by a company named U-box), and Chinese Mobile Time of Day (CMTOD). For example, the link is a 1PPS+TOD synchronization link.

Before the time synchronization is performed, clock parameters need to be configured for each network device in the network, and mainly include: a clock identity (ID), a priority level 1 (priority 1), a priority level 2 (priority 2), and a clock class (Clock Class).

During the time synchronization, two network devices connected via the in-band synchronization link can send in-band time synchronization information to each other, for example, NE1 and NE3 can send in-band time synchronization information to each other. The in-band time synchronization information includes information needed by a Best Master Clock (BMC) algorithm in the IEEE1588 protocol, and specifically includes: a grandmaster clock identity (Grandmaster Identity), a priority level 1 (priority 1), a priority level 2 (priority 2), a clock class (Clock Class), time stability (offsetScaledLogVariance), a hop count (stepRemoved), clock accuracy (clockAccuracy), and a type of time source (timeSource).

The in-band time synchronization information is carried in an announce packet. At the beginning of the time synchronization, that is, when each network device in the network does not have the time thereof synchronized with the time of another network device and still has its own time, the grandmaster clock identity in the in-band time synchronization information is the clock identity configured for the network device, and the priority level 1 and the priority level 2 in the in-band time synchronization information are also the priority level 1 and the priority level 2 configured for the network device.

After receiving the in-band time synchronization information, the network device builds a reference source data set according to the specific information in the in-band time synchronization information, and the reference source data set includes the grandmaster clock identity, the priority level 1, and the priority level 2 in the in-band time synchronization information.

Two network devices connected via the out-of-band synchronization link can merely allow sending out-of-band time synchronization information from the input end to the output end of the out-of-band synchronization link, for example, NE1 can send out-of-band time synchronization information to NE2, but NE2 cannot send out-of-band time synchronization information to NE1. The out-of-band time synchronization information carries a time offset (leaps) between GPS and Coordinated Universal Time (UTC), a PPS state, and other information, but does not carry the information needed by the BMC algorithm in the IEEE1588 protocol such as the grandmaster clock identity, the priority level 1, the priority level 2, the clock class, the time stability, the hop count, the clock accuracy, and the type of time source.

After receiving the out-of-band time synchronization information, the network device builds a reference source data set according to the out-of-band time synchronization information, and the reference source data set needs include the information such as the grandmaster clock identity, the priority level 1, and the priority level 2. However, the out-of-band time synchronization information does not include such information, so that the clock identity configured for NE2 is taken as the grandmaster clock identity and the priority level 1 and the priority level 2 configured for NE2 are taken as the priority level 1 and the priority level 2 in the reference source data set.

With reference to FIG. 3, assuming that in a process of configuring the clock parameters for the network devices in the network, the clock identities of NE1, NE2, and NE3 are their respective Media Access Control (MAC) addresses; and the priority level 1 (priority 1) and the priority level 2 (priority 2) of each of NE1 and NE3 are configured as 128 and 30 respectively (the priority levels are expressed in the form of A/B in FIG. 3, with A representing the priority level 1 and B representing the priority level 2), and the priority level 1 and the priority level 2 of NE2 are configured as 128 and 20, respectively.

After NE2 receives the out-of-band time synchronization information from NE1 via the out-of-band synchronization link, NE2 needs to map a port connected to the out-of-band synchronization link or NE1 to be a port connected to the in-band synchronization link, that is, NE2 needs to build the reference source data set according to the out-of-band time synchronization information from NE1. Since the out-of-band time synchronization information does not carry the information such as the priority level 1 and the priority level 2, the grandmaster clock identity is represented by the MAC address of NE2 and the priority level 1 and the priority level 2 of NE2, i.e., 128 and 20, are used to represent the priority level 1 and the priority level 2 in the reference source data set when NE2 builds the reference source data set according to the out-of-band time synchronization information from NE1.

NE2 receives the in-band time synchronization information from NE3 via the in-band synchronization link, and the in-band time synchronization information carries the information such as the grandmaster clock identity, the priority level 1, the priority level 2, and the clock class. Since it is at the beginning of the time synchronization, the time of NE3 is not synchronized with the time of another network device. Therefore, the grandmaster clock identity in the in-band time synchronization information from NE3 is the MAC address of NE3, and the priority level 1 and the priority level 2 in the in-band time synchronization information from NE3 are the priority level 1 and the priority level 2 of NE3, i.e., 128 and 30, respectively.

Since the value of the priority level 2 in the reference source data set built according to the out-of-band time synchronization information is less than that of the priority level 2 in the reference source data set built according to the in-band time synchronization information, NE2 selects the network device connected thereto via the out-of-band synchronization link as a time source by the BMC algorithm, that is, NE2 has the time thereof synchronized with the time of NE1, and sets the port of NE2 connected to NE1 to be in a Slave state (a slave port state), and sets a port of NE2 connected to NE3 to be in a Master state (a master port state).

NE2 sends the in-band time synchronization information to NE3 via the in-band synchronization link. At this time, since NE2 has selected the network device connected thereto via the out-of-band synchronization link as the time source, the grandmaster clock identity is the MAC address of NE2, the priority level 1 is 128, and the priority level 2 is 20 in the in-band time synchronization information sent by NE2 to NE3.

NE3 not only receives the in-band time synchronization information from NE2 but also receives the in-band time synchronization information from NE1. Since NE1 does not have the time thereof synchronized with the time of another network device, the grandmaster clock identity in the in-band time synchronization information from NE1 is the MAC address of NE1, and the priority level 1 and the priority level 2 are the priority level 1 and the priority level 2 of NE1, i.e., 128 and 30, respectively. Apparently, since the value of the priority level 2 in the reference source data set built according to the in-band time synchronization information from NE2 is less than that of the priority level 2 in the reference source data set built according to the in-band time synchronization information from NE1, NE3 selects NE2 as a time source by the BMC algorithm, that is, NE3 has the time thereof synchronized with the time of NE2.

NE3 sends the in-band time synchronization information to NE1 via the in-band synchronization link. At this time, since N3 has selected the network device connected thereto via the out-of-band synchronization link as the time source, the grandmaster clock identity in the in-band time synchronization information sent by NE3 to NE1 is the grandmaster clock identity in the in-band time synchronization information sent by NE2 to NE3, i.e., the MAC address of NE2, and similarly, the priority level 1 is 128 and the priority level 2 is 20.

After NE1 receives the in-band time synchronization information from NE3, NE1 selects the time source of NE3 as its own time source by the BMC algorithm because the current clock parameters of NE3 are better than those of NE1 (the value of the priority level 2 of NE3 is less than that of the priority level 2 of NE1), that is, NE1 has the time thereof synchronized with the time of NE3. Since NE3 is synchronized with NE2, NE1 is also synchronized with NE2. As described above, although NE2 "believes" that the time source of NE2 is itself because the out-of-band synchronization link cannot carry the grandmaster clock identity, NE2 essentially has the time thereof synchronized with the time of NE1, thus forming a timing loop of NE1-NE2-NE3-NE1.

In some related techniques, the network devices are grouped into different layers, and the network devices in the different layers are configured with different priority levels. With reference to FIG. 3, NE1 and the upstream node (e.g. NE3) thereof are grouped in a first layer, and the downstream node (e.g. NE2) of NE1 is grouped in a second layer, with a first layer priority level of the first layer being higher than a second layer priority level of the second layer. The timing loop is broken by performing selection of time sources according to the priority levels of the different layers. However, due to introduction of new parameters, the above method cannot be easily used together with the related techniques.

In a first aspect, with reference to FIG. 1, the embodiments of the present disclosure provide a time synchronization method applied to a first node which is provided with at least one output port connected to an input port of a second node via an out-of-band synchronization link and at least one additional output port connected to a third node via an in-band synchronization link.

The first node refers to a network device in a network, and is connected to at least one of other network devices (i.e., the third node) in the network via the in-band synchronization link. Meanwhile, as an input end of the out-of-band synchronization link, the first node is connected to a network device (i.e., the second node) in the network, which serves as an output end of the out-of-band synchronization link, via the out-of-band synchronization link.

The network may be provided with a plurality of network devices each satisfying a requirement that the network device is connected to at least one of the other network devices in the network via the in-band synchronization link, and is connected, as the input end of the out-of-band synchronization link, to the network device in the network, which serves as the output end of the out-of-band synchronization link, via the out-of-band synchronization link. In different time synchronization processes, the network devices used as the first nodes may be different.

As shown in FIG. 1, the time synchronization method specifically includes operation S101.

In the operation S101, out-of-band time synchronization information is sent to the second node via the out-of-band synchronization link, with the out-of-band time synchronization information including a grandmaster clock identity of the first node.

The first node sends the out-of-band time synchronization information to the second node in the network via the out-of-band synchronization link. Unlike the out-of-band time synchronization information described above, the out-of-band time synchronization information according to the embodiments of the present disclosure carries the grandmaster clock identity of the first node.

When the first node does not have the time thereof synchronized with the time of another network device in the network, the grandmaster clock identity of the first node is a clock identity of the first node, and may specifically be a MAC address of the first node; and when the first node have had the time thereof synchronized with the time of another network device in the network, the grandmaster clock identity of the first node is a clock identity of a time source with which the first node is synchronized, for example, with reference to FIG. 3, the time source of NE1 is NE2, so the grandmaster clock identity of NE1 is the MAC address of NE2.

With the time synchronization method provided by the embodiments of the present disclosure, the grandmaster clock identity of the first node is added to the out-of-band time synchronization information and sent to the second node, so that the second node can perform, after receiving the out-of-band time synchronization information from the first node, time synchronization merely according to the in-band time synchronization information received from the third node if the second node finds that the grandmaster clock identity of the first node is a clock identity of the second node. When the grandmaster clock identity of the first node is the clock identity of the second node, which indicates that the first node, the second node, and the other nodes in the network form a timing loop, the second node performs the time synchronization merely according to the in-band time synchronization information sent by the third node, that is, the time of the second node is not synchronized with the time of the first node. That is, for example, with reference to FIG. 3, the time of NE2 is not synchronized with the time of NE1, so that the timing loop of NE1-NE2-NE3-NE1 is not formed, which produces an effect of breaking the timing loop. Meanwhile, since the grandmaster clock identity of the first node is an existing parameter, no new parameter needs to be added, which enhances compatibility with the related techniques.

In an implementation, the out-of-band synchronization link is a 1PPS+TOD synchronization link.

Specifically, the out-of-band synchronization link may be the 1PPS+TOD synchronization link, and the in-band synchronization link may be a PTP link.

In some related techniques, PPS states of a TOD frame carrying a time information message in a 1PPS+TOD packet sent by an input end of the 1PPS+TOD synchronization link to an output end of the 1PPS+TOD synchronization link in the network may correspond to clock classes of the PTP, and a specific corresponding relationship is illustrated by the table below.

| Code of PPS State | Code of Clock Class | Description of State |
| --- | --- | --- |
| 0x00 | 6 | both frequency and time of a time synchronization device follow a satellite |
| 0x01 | 7 | a time synchronization device loses a time source, and a frequency of the time synchronization device follows a Primary Reference Clock (PRC) |
| 0x05 | 8 | a time synchronization device loses a time source, and a frequency of the time synchronization device is in a level of SSU_A |
| 0x03 | 52 | a time synchronization device loses a time source, and a frequency of the time synchronization device is in a level of SSU_B |
| 0x02 | 255 | unavailable |

With the PPS states of the TOD frame carrying the time information message in the 1PPS+TOD packet corresponding to the clock classes of the PTP, in a process of building a reference source data set according to the out-of-band time synchronization information, a clock class may be acquired according to the 1PPS+TOD packet and used as a clock class of the built reference source data set, thus solving the problem that the clock class cannot be carried in the out-of-band time synchronization information.

In an implementation, the out-of-band time synchronization information further includes a priority level 1, a priority level 2, and a hop count of the first node.

In addition to including the grandmaster clock identity of the first node, the out-of-band time synchronization information sent by the first node may include the priority level 1, the priority level 2, and the hop count of the first node, and may further include other information such as time stability and clock accuracy.

Similar with the case of the grandmaster clock identity of the first node, when the first node does not have the time thereof synchronized with the time of another network device in the network, the priority level 1 and the priority level 2 of the first node are the priority level 1 and the priority level 2 of the first node, for example, with reference to FIG. 3, the priority level 1 and the priority level 2 are 128 and 30, respectively; and when the first node has the time thereof synchronized with the time of another network device in the network, the priority level 1 and the priority level 2 of the first node are a priority level 1 and a priority level 2 carried in in-band time synchronization information corresponding to the time with which the time of the first node is synchronized, that is, the priority level 1 and the priority level 2 of the first node are a priority level 1 and a priority level 2 of a time source of the first node. For example, with reference to FIG. 3, the time source of NE1 is NE2, so the priority level 1 and the priority level 2 of NE1 are the priority level 1 and the priority level 2 of NE2, i.e., 128 and 20.

A hop count refers to the number of other network devices through which a current network device is connected to a time source thereof via an in-band synchronization link. For example, with reference to FIG. 3, the time sources of both NE3 and NE1 are NE2, NE3 is directly connected to NE2 via the in-band synchronization link, and NE1 is connected to NE2 through NE3 via the in-band synchronization link, so a hop count of NE3 is apparently less than that of NE1.

By sending the priority level 1, the priority level 2, and the hop count to the second node, accuracy of building a reference source data set by the second node according to the priority level 1, the priority level 2, and the hop count is improved, so that the second node can conveniently select a correct time source according to the built reference source data set.

For example, with reference to FIG. 3, after NE2 receives the out-of-band time synchronization information from NE1 via the out-of-band synchronization link, if the out-of-band time synchronization information carries the grandmaster clock identity, the priority level 1, the priority level 2, and the hop count, when NE2 maps the port connected to the out-of-band synchronization link or NE1 to be the port connected to the in-band synchronization link, that is, when N2 builds the reference source data set according to the out-of-band time synchronization information from NE1, the grandmaster clock identity, the priority level 1, and the priority level 2 carried in the out-of-band time synchronization information may be directly used as the grandmaster clock identity, the priority level 1, and the priority level 2 of the reference source data set, that is, the priority level 1 and the priority level 2 of NE1 instead of the default priority level 1 and the default priority level 2 of NE2 are directly used. At this time, since the values of the priority level 1 and the priority level 2 in the reference source data set built according to the out-of-band time synchronization information are the same as the values of the priority level 1 and the priority level 2 in the reference source data set built according to the in-band time synchronization information, NE2 may select NE3 as a data source of NE2, which may avoid formation of the timing loop to some extent.

Specifically, the grandmaster clock identity, the priority level 1, the priority level 2, and the hop count of the first node in the out-of-band time synchronization information are carried in the 1PPS+TOD packet and sent to the second node.

A specific structure of the TOD frame of the 1PPS+TOD packet is shown in FIG. 4, and includes a frame header composed of two bytes of SYNCCHAR1 and SYNCCHAR2, a message header composed of two bytes of CLASS (message class) and ID (message ID), LENGTH BIG Endian (message length field) occupying two bytes, Payload (payload field), and FCS (frame check sequence field).

SYNCCHAR1 occupies one byte, has a fixed value of 0X43, and represents the character "C" in ASCII; and SYNCCHAR2 occupies one byte, has a fixed value of 0X4D, and represents the character "M" in the ASCII. The message class occupies one byte and specifies a basic class of a TOD message, and the message ID occupies one byte and defines a specific number of the TOD message. An effective range calculated as the message length field merely includes Payload (i.e., the payload field) of the message, and does not include the frame header, the message header, the message length field itself, and the frame check sequence field. The payload field carries specific content of the message and currently occupies 16 bytes. The frame check sequence field is used for frame check, and a generation polynomial of a frame check sequence is: $G(x)=x^8+x^5+x^4+1$.

There are two types of 1PPS+TOD packets: one carries a time information message and the other carries a time status message. The following table illustrates a specific structure of a payload field of a TOD frame of a 1PPS+TOD packet carrying the time information message. The payload field of the TOD frame of the 1PPS+TOD packet carrying the time information message has 7 reserved bytes.

| Byte Offset | Data Type | Zoom Ratio | Name | Unit | Note |
|---|---|---|---|---|---|
| 0 | U4 | — | Time of Week (TOW) | s | GPS Second time of Week |
| 4 | I4 | — | Reserved | — | reserved |
| 8 | U2 | — | Week | — | GPS Weeks (GPS time) |
| 10 | I1 | — | LeapS | s | Leap Seconds (GPS-UTC) a time offset between GPS and UTC |
| 11 | U1 | — | PPS state | — | 0x00 = normal<br>0x01 = degrade<br>0x02 = unavailable<br>others: reserved |
| 12 | U1 | — | TAcc | — | PPS jitter magnitude (0-255)<br>0-0 ns<br>1-15 ns<br>2-30 ns<br>255-meaningless<br>a transmission device has a fixed value of 255 |
| 13 | U1 | — | Reserved | — | reserved |
| 14 | U1 | — | Reserved | — | reserved |
| 15 | U1 | — | Reserved | — | reserved |

The following table illustrates a specific structure of a payload field of a TOD frame of a 1PPS+TOD packet carrying the time status message. The payload field of the TOD frame of the 1PPS+TOD packet carrying the time status message has 11 reserved bytes.

| Byte Offset | Data Type | Zoom Ratio | Name | Unit | Note |
|---|---|---|---|---|---|
| 0 | U1 | — | type of time source | — | 0x00: PTP<br>0x01: GPS<br>0x02: 1588 |
| 1 | U2 | — | operation state of time source | — | GPSfix Type, range 0 . . . 3<br>0x00 = no fix<br>0x01 = dead reckoning only<br>0x02 = 2D-fix |

-continued

| Byte Offset | Data Type | Zoom Ratio | Name | Unit | Note |
|---|---|---|---|---|---|
| 3 | U2 | — | Monitor Alarm | — | 0x03 = 3D-fix<br>0x04 = GPS + dead reckoning combined<br>0x05 = Time only fix<br>0x06 . . . 0xff = reserved<br>alarm of state of time source:<br>Bit 0: not used<br>Bit 1: Antenna open<br>Bit 2: Antenna shorted<br>Bit 3: Not tracking satellites<br>Bit 4: not used<br>Bit 5: Survey-in progress<br>Bit 6: not stored position<br>Bit 7: Leap second pending<br>Bit 8: In test mode<br>Bit 9: Position is questionable<br>Bit 10: not used<br>Bit 11: Almanac not complete<br>Bit 12: PPS was generated |
| 5 | U1 | — | Reserved | — | reserved |
| 6 | U1 | — | Reserved | — | reserved |
| 7 | U1 | — | Reserved | — | reserved |
| 8 | U4 | — | Reserved | — | reserved |
| 12 | U4 | — | Reserved | — | reserved |

Since the grandmaster clock identity needs to occupy eight bytes and each of the priority level 1, the priority level 2, and the hop count needs to occupy one byte, the grandmaster clock identity, the priority level 1, the priority level 2, and the hop count occupy eleven bytes in total. The grandmaster clock identity, the priority level 1, the priority level 2, and the hop count may be placed in the reserved bytes of the payload field of the TOD frame of the 1PPS+TOD packet carrying the time status message and sent to the second node. The following table illustrates a specific structure of an extended payload field of the TOD frame of the 1PPS+TOD packet carrying the time status message, with the grandmaster clock identity, the priority level 1, the priority level 2, and the hop count carried in the last bytes with the byte offsets of 5, 6, 7, and 8.

| Byte Offset | Data Type | Zoom Ratio | Name | Unit | Note |
|---|---|---|---|---|---|
| 0 | U1 | — | type of time source | — | 0x00: PTP<br>0x01: GPS<br>0x02: 1588 |
| 1 | U2 | — | operation state of time source | — | GPSfix Type, range 0 . . . 3<br>0x00 = no fix<br>0x01 = dead reckoning only<br>0x02 = 2D-fix<br>0x03 = 3D-fix<br>0x04 = GPS + dead reckoning combined<br>0x05 = Time only fix<br>0x06 . . . 0xff = reserved |
| 3 | U2 | — | Monitor Alarm | — | alarm of state of time source:<br>Bit 0: not used<br>Bit 1: Antenna open<br>Bit 2: Antenna shorted<br>Bit 3: Not tracking satellites<br>Bit 4: not used<br>Bit 5: Survey-in progress<br>Bit 6: not stored position<br>Bit 7: Leap second pending<br>Bit 8: In test mode<br>Bit 9: Position is questionable<br>Bit 10: not used<br>Bit 11: Almanac not complete<br>Bit 12: PPS was generated |
| 5 | U1 | — | Reserved | — | priority1 |
| 6 | U1 | — | Reserved | — | priority2 |
| 7 | U1 | — | Reserved | — | stepRemoved |
| 8 | U4 | — | Reserved | — | Grandmaster Identity |

Sending the grandmaster clock identity, the priority level 1, the priority level 2, and the hop count with an existing packet can be easily used together with the related techniques; and moreover, transmission resources are saved because no new packet needs to be sent. Apparently, the grandmaster clock identity, the priority level 1, the priority level 2, and the hop count may also be sent by other means, for example, the grandmaster clock identity, the priority level 1, the priority level 2, and the hop count are carried in the reserved bytes of the payload field of the TOD frame of the 1PPS+TOD packet carrying the time status message together with the reserved bytes of the payload field of the TOD frame of the 1PPS+TOD packet carrying the time information message.

In a second aspect, with reference to FIG. 2, the embodiments of the present disclosure provide a time synchronization method applied to a second node which is provided with at least one input port connected to an output port of a first node via an out-of-band synchronization link and at least one additional input port connected to a third node via an in-band synchronization link.

The second node refers to a network device in a network, and is connected to at least one of other network devices (i.e., the third node) in the network via the in-band synchronization link. Meanwhile, as an output end of the out-of-band synchronization link, the second node is connected to a network device (i.e., the first node) in the network, which serves as an input end of the out-of-band synchronization link, via the out-of-band synchronization link.

The network may be provided with a plurality of network devices each satisfying a requirement that the network device is connected to at least one of the other network devices in the network via the in-band synchronization link, and is connected, as the output end of the out-of-band synchronization link, to the network device in the network, which serves as the input end of the out-of-band synchronization link, via the out-of-band synchronization link. In different time synchronization processes, the network devices used as the second nodes may be different.

As shown in FIG. 2, the time synchronization method specifically includes operation S201, operation S202, and operation S203.

In the operation S201, out-of-band time synchronization information sent by the first node and in-band time synchronization information sent by at least one third node are received, with the out-of-band time synchronization information including a grandmaster clock identity of the first node.

The second node simultaneously receives the out-of-band time synchronization information sent by the first node connected to the second node via the out-of-band synchronization link, and the in-band time synchronization information send by at least one third node connected to the second node via the in-band synchronization link.

The out-of-band time synchronization information not only includes information such as a time offset between GPS and UTC and a PPS state, but also includes the grandmaster clock identity of the first node; and the in-band time synchronization information includes information of the third node, such as a grandmaster clock identity, a priority level 1, a priority level 2, and a hop count of the third node.

In the operation S202, in a case where the grandmaster clock identity of the first node is an identity of the second node, one of all third nodes is determined as a preferred node according to the in-band time synchronization information, and the time of the second node is synchronized with the time of the preferred node.

After the second node receives the out-of-band time synchronization information from the first node, if the second node finds that the grandmaster clock identity of the first node in the out-of-band time synchronization information is the identity of the second node, such as a MAC address of the second node, the second node builds a reference source data set of each third node according to the in-band time synchronization information sent by each third node connected to the second node, and the reference source data set corresponding to each third node needs to include the grandmaster clock identity, the priority level 1, the priority level 2, and the hop count carried in the in-band time synchronization information sent by the third node.

The second node determines one of the third nodes corresponding to the received in-band time synchronization information as the preferred node by the BMC algorithm according to the reference source data set corresponding to each third node, and has the time of the second node synchronized with the time of the preferred node.

In the operation S203, in a case where the grandmaster clock identity of the first node is not the identity of the second node, one node among the first node and all the third nodes is determined as a preferred node according to the out-of-band time synchronization information and the in-band time synchronization information, and the time of the second node is synchronized with the time of the preferred node.

After the second node receives the out-of-band time synchronization information from the first node, if the second node finds that the grandmaster clock identity of the first node in the out-of-band time synchronization information is not the identity of the second node, the second node builds the reference source data set of each third node according to the in-band time synchronization information sent by each third node connected to the second node, and the reference source data set corresponding to each third node needs to include the grandmaster clock identity, the priority level 1, the priority level 2, and the hop count carried in the in-band time synchronization information sent by the third node. Meanwhile, the second node maps the input port connected to the first node to be a port of the in-band synchronization link, that is, the second node builds a reference source data set of the first node according to the out-of-band time synchronization information sent by the first node, and the reference source data set corresponding to the first node needs to include the grandmaster clock identity of the first node. If the out-of-band time synchronization information does not include the priority level 1, the priority level 2 or the hop count, the priority level 1 and the priority level 2 of the second node are taken as the priority level 1 and the priority level 2 of the reference source data set corresponding to the first node.

The second node determines one node among the third nodes corresponding to the received in-band time synchronization information and the first node as the preferred node by the BMC algorithm according to the reference source data set corresponding to the first node and the reference source data set corresponding to each third node, and has the time of the second node synchronized with the time of the preferred node.

With the time synchronization method provided by the embodiments of the present disclosure, the grandmaster clock identity of the first node is added to the out-of-band time synchronization information and sent to the second node, so that the second node performs, after receiving the out-of-band time synchronization information from the first node, time synchronization merely according to the in-band time synchronization information received from the third node if the second node finds that the grandmaster clock identity of the first node is the identity of the second node. When the grandmaster clock identity of the first node is the identity of the second node, which indicates that the first node, the second node, and the other nodes in the network form a timing loop, the second node performs the time synchronization merely according to the in-band time synchronization information sent by the third node, that is, the time of the second node is not synchronized with the time of the first node. That is, for example, with reference to FIG. 3, the time of NE2 is not synchronized with the time of NE1, so that the timing loop of NE1-NE2-NE3-NE1 is not formed, which produces an effect of breaking the timing loop. Meanwhile, since the grandmaster clock identity of the first node is an existing parameter, no new parameter needs to be added, which enhances the compatibility with the related techniques.

In an implementation, the in-band synchronization link is a PTP link.

In an implementation, the out-of-band synchronization link is a 1PPS+TOD synchronization link.

Specifically, the out-of-band synchronization link may be the 1PPS+TOD synchronization link, and the in-band synchronization link may be the PTP link.

In some related techniques, PPS states of a TOD frame carrying a time information message in a 1PPS+TOD packet sent by an input end of the 1PPS+TOD synchronization link to an output end of the 1PPS+TOD synchronization link in the network may correspond to clock classes of the PTP.

With the PPS states of the TOD frame carrying the time information message in the 1PPS+TOD packet corresponding to the clock classes of the PTP, in a process of building a reference source data set according to the out-of-band time synchronization information, a clock class may be acquired according to the 1PPS+TOD packet and used as a clock class of the built reference source data set, thus solving the problem that the clock class cannot be carried in the out-of-band time synchronization information.

In an implementation, between receiving the out-of-band time synchronization information sent by the first node and the in-band time synchronization information sent by the at least one third node and determining the one node among the first node and all the third nodes as the preferred node according to the out-of-band time synchronization information and the in-band time synchronization information, the method may further include: mapping the port of the second node serving as an input port of the 1PPS+TOD synchronization link to be an input port of the PTP link.

In an implementation, mapping the port of the second node serving as the input port of the 1PPS+TOD synchronization link to be the input port of the PTP link includes: building a 1PPS+TOD reference source data set according to the out-of-band time synchronization information, with a grandmaster clock identity in the 1PPS+TOD reference source data set being the grandmaster clock identity of the first node.

After the second node receives the out-of-band time synchronization information from the first node, if the second node finds that the grandmaster clock identity of the first node in the out-of-band time synchronization information is not the identity of the second node, the second node builds the reference source data set of each third node according to the in-band time synchronization information sent by each third node connected to the second node, and the reference source data set corresponding to each third node needs to include the grandmaster clock identity, the priority level 1, the priority level 2, and the hop count carried in the in-band time synchronization information sent by the third node.

Meanwhile, when the second node maps the input port connected to the first node (the port of the 1PPS+TOD synchronization link) to be the input port of the PTP link, a specific mapping process may be: building the reference source data set of the first node, which needs to include the grandmaster clock identity of the first node, according to the out-of-band time synchronization information sent by the first node. If the out-of-band time synchronization information does not include a priority level 1, a priority level 2 or a hop count, the priority level 1 and the priority level 2 of the second node are taken as the priority level 1 and the priority level 2 of the reference source data set corresponding to the first node.

In an implementation, the out-of-band time synchronization information further includes a priority level 1, a priority level 2, and a hop count of the first node; and the 1PPS+TOD reference source data set further includes the priority level 1, the priority level 2, and the hop count of the first node.

The out-of-band time synchronization information sent by the first node to the second node further includes the priority level 1, the priority level 2, and the hop count of the first node, and the priority level 1, the priority level 2, and the hop count of the first node are a priority level 1, a priority level 2, and a hop count of a time source with which the first node is synchronized.

Accordingly, after the second node receives the out-of-band time synchronization information from the first node, if the second node finds that the grandmaster clock identity of the first node in the out-of-band time synchronization information is not the identity of the second node, the reference source data set corresponding to the first node needs to include the grandmaster clock identity, the priority level 1, the priority level 2, and the hop count of the first node carried in the out-of-band time synchronization information sent by the first node when the second node builds the reference source data set of the first node according to the out-of-band time synchronization information sent by the first node.

The second node determines the one node among the third nodes corresponding to the received in-band time synchronization information and the first node as the preferred node by the BMC algorithm according to the reference source data set corresponding to the first node and the reference source data set corresponding to each third node, and has the time of the second node synchronized with the time of the preferred node.

With the second node receiving the priority level 1, the priority level 2, and the hop count of the first node, accuracy of building the reference source data set of the first node by the second node according to the priority level 1, the priority level 2, and the hop count is improved (because the priority level 1, the priority level 2, and the hop count of the first node instead of the priority level 1 and the priority level 2 of the second node are used), so that the second node can conveniently select a correct time source according to the built reference source data sets.

With reference to FIG. 3, a specific process of the time synchronization method provided by the embodiments of the present disclosure may be: if the time source of NE1 is optimal, after NE2 receives the out-of-band time synchronization information sent by NE1 and the in-band time synchronization information sent by NE3, NE2 restores the reference source data set of NE3 from the in-band time synchronization information received from NE3, with the reference source data set including the grandmaster clock identity, the priority level 1, the priority level 2, and the hop count carried in the in-band time synchronization information sent by NE3. NE2 performs port mapping and builds the reference source data set corresponding to NE1 according to the out-of-band time synchronization information sent by NE1, with the grandmaster clock identity, the priority level 1, the priority level 2, and the hop count extracted from the out-of-band time synchronization information, a clock class obtained through mapping based on a received PPS state, and clock accuracy and time stability filled in by default.

At this time, the grandmaster clock identity in the reference source data set corresponding to NE1 is the MAC address of NE1, which is inconsistent with the MAC address of NE2. Mixed source selection is performed according to the reference source data set corresponding to NE1 and the reference source data set corresponding to NE3: according to the BMC algorithm, the hop count in the reference source data set corresponding to NE1 is less than that in the reference source data set corresponding to NE3, indicating that the time source of NE1 is better than that of NE3, so the time of NE2 is synchronized with the time of NE1.

Similarly, if the time source of NE3 is optimal, after NE2 receives the out-of-band time synchronization information sent by NE1 and the in-band time synchronization information sent by NE3, NE2 restores the reference source data set of NE3 from the in-band time synchronization information received from NE3, with the reference source data set including the grandmaster clock identity, the priority level 1, the priority level 2, and the hop count carried in the in-band time synchronization information sent by NE3. NE2 performs port mapping and builds a GPS time source data set (i.e., the reference source data set corresponding to NE1) according to a GPS synchronization packet sent by NE1.

At this time, the grandmaster clock identity in the reference source data set corresponding to NE1 is the MAC address of NE3, which is inconsistent with the MAC address of NE2. Mixed source selection is performed according to the reference source data set corresponding to NE1 and the reference source data set corresponding to NE3: according to the BMC algorithm, the hop count in the reference source data set corresponding to NE1 is greater than that in the reference source data set corresponding to NE3, indicating that the time source of NE3 is better than that of NE1, so the time of NE2 is synchronized with the time of NE3.

If the time source of NE2 is optimal, after NE2 receives the out-of-band time synchronization information sent by NE1 and the in-band time synchronization information sent by NE3, NE2 restores the reference source data set of NE3 from the in-band time synchronization information received from NE3, with the reference source data set including the grandmaster clock identity, the priority level 1, the priority level 2, and the hop count carried in the in-band time synchronization information sent by NE3. NE2 restores a GPS time source data set from a GPS synchronization packet sent by NE1.

At this time, the grandmaster clock identity in the reference source data set corresponding to NE1 is the MAC address of NE2, which is consistent with the MAC address of NE2, indicating that a timing loop may exist. Therefore, merely the reference source data set corresponding to NE3 is used for source selection: according to the BMC algorithm, NE2 serves as a time source, the port of NE2 connected to NE3 serves as a master port, and a port of NE3 connected to NE2 serves as a slave port.

In a third aspect, with reference to FIG. 5, the embodiments of the present disclosure provide a first node provided with at least one output port connected to an input port of a second node via an out-of-band synchronization link and at least one additional output port connected to a third node via an in-band synchronization link, and the first node includes: a sending module configured to send out-of-band time synchronization information to the second node via the out-of-band synchronization link, with the out-of-band time synchronization information including a grandmaster clock identity of the first node.

With the first node provided by the embodiments of the present disclosure, the grandmaster clock identity of the first node is added to the out-of-band time synchronization information and sent to the second node, so that the second node performs, after receiving the out-of-band time synchronization information from the first node, time synchronization merely according to in-band time synchronization information received from the third node if the second node finds that the grandmaster clock identity of the first node is an identity of the second node. When the grandmaster clock identity of the first node is the identity of the second node, which indicates that the first node, the second node, and other nodes in the network form a timing loop, the second node performs the time synchronization merely according to the in-band time synchronization information sent by the third node, that is, the time of the second node is not synchronized with the time of the first node. That is, for example, with reference to FIG. 3, the time of NE2 is not synchronized with the time of NE1, so that the timing loop of NE1-NE2-NE3-NE1 is not formed, which produces an effect of breaking the timing loop. Meanwhile, since the grandmaster clock identity of the first node is an existing parameter, no new parameter needs to be added, which enhances the compatibility with the related techniques.

In a fourth aspect, with reference to FIG. 6, the embodiments of the present disclosure provide a second node provided with at least one input port connected to an output port of a first node via an out-of-band synchronization link and at least one additional input port connected to a third node via an in-band synchronization link, and the second node includes: a receiving module, a first processing module, and a second processing module.

The receiving module is configured to receive out-of-band time synchronization information sent by the first node and in-band time synchronization information sent by at least one third node, with the out-of-band time synchronization information including a grandmaster clock identity of the first node The first processing module is configured to determine, in a case where the grandmaster clock identity of the first node is an identity of the second node, one of all third nodes as a preferred node according to the in-band time synchronization information, and synchronize the time of the second node with the time of the preferred node.

The second processing module is configured to determine, in a case where the grandmaster clock identity of the first node is not the identity of the second node, one node among the first node and all the third nodes as a preferred node according to the out-of-band time synchronization information and the in-band time synchronization information, and synchronize the time of the second node with the time of the preferred node.

With the second node provided by the embodiments of the present disclosure, the grandmaster clock identity of the first node is added to the out-of-band time synchronization information and sent to the second node, so that the second node performs, after receiving the out-of-band time synchronization information from the first node, time synchronization merely according to the in-band time synchronization information received from the third node if the second node finds that the grandmaster clock identity of the first node is the identity of the second node. When the grandmaster clock identity of the first node is the identity of the second node, which indicates that the first node, the second node, and other nodes in the network form a timing loop, the second node performs the time synchronization merely according to the in-band time synchronization information sent by the third node, that is, the time of the second node is not synchronized with the time of the first node. That is, for example, with reference to FIG. 3, the time of NE2 is not synchronized with the time of NE1, so that the timing loop of NE1-NE2-NE3-NE1 is not formed, which produces an effect of breaking the timing loop. Meanwhile, since the grandmaster clock identity of the first node is an existing parameter, no new parameter needs to be added, which enhances the compatibility with the related techniques.

In a fifth aspect, with reference to FIG. 7, the embodiments of the present disclosure provide a network, including: a first node provided with at least one output port connected to an input port of a second node via an out-of-band synchronization link and at least one additional output port connected to a third node via an in-band synchronization link; and a second node provided with at least one additional input port connected to the third node via an in-band synchronization link.

With the network provided by the embodiments of the present disclosure, a grandmaster clock identity of the first node is added to out-of-band time synchronization information and sent to the second node, so that the second node performs, after receiving the out-of-band time synchronization information from the first node, time synchronization merely according to in-band time synchronization information received from the third node if the second node finds that the grandmaster clock identity of the first node is an identity of the second node. When the grandmaster clock identity of the first node is the identity of the second node, which indicates that the first node, the second node, and other nodes in the network form a timing loop, the second node performs the time synchronization merely according to the in-band time synchronization information sent by the third node, that is, the time of the second node is not synchronized with the time of the first node. That is, for example, with reference to FIG. 3, the time of NE2 is not synchronized with the time of NE1, so that the timing loop of NE1-NE2-NE3-NE1 is not formed, which produces an effect of breaking the timing loop. Meanwhile, since the grandmaster clock identity of the first node is an existing parameter, no new parameter needs to be added, which enhances the compatibility with the related techniques.

It should be understood by those of ordinary skill in the art that the functional modules/units in all or some of the operations, the systems and the devices disclosed above may be implemented as software, firmware, hardware, or suitable combinations thereof.

If implemented as hardware, the division between the functional modules/units stated above is not necessarily corresponding to the division of physical components; and for example, one physical component may have a plurality of functions, or one function or operation may be performed through cooperation of several physical components.

Some or all of the physical components may be implemented as software executed by a processor, such as a Central Processing Unit (CPU), a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, a Random Access Memory (RAM, more specifically, a Synchronous Dynamic RAM (SDRAM), a Double Data Rate SDRAM (DDR SDRAM), etc.), a Read Only Memory (ROM), an Electrically Erasable Programmable Read-Only Memory (EEPROM), a flash memory (FLASH) or other magnetic storage devices; a Compact Disc Read Only Memory (CD-ROM), a Digital Versatile Disc (DVD) or other optical discs; a magnetic cassette, a magnetic tape, a magnetic disk or other magnetic storage devices; and any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses the exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details can be made without departing from the scope of the present disclosure of the appended claims.

What is claimed is:

1. A time synchronization method applied to a first node provided with at least one output port connected to an input port of a second node via an out-of-band synchronization link and at least one additional output port connected to a third node via an in-band synchronization link, comprising:
    sending out-of-band time synchronization information to the second node via the out-of-band synchronization link, wherein the out-of-band time synchronization information comprises a grandmaster clock identity of the first node,
    wherein the out-of-band time synchronization information further comprises a priority level 1, a priority level 2, and a hop count of the first node.

2. The method of claim 1, wherein the out-of-band synchronization link is a 1 Pulse Per Second (PPS)+Time of Day (TOD) synchronization link.

3. A time synchronization method applied to a second node provided with at least one input port connected to an output port of a first node via an out-of-band synchronization link and at least one additional input port connected to a third node via an in-band synchronization link, comprising:
    receiving out-of-band time synchronization information sent by the first node and in-band time synchronization information sent by at least one third node, wherein the out-of-band time synchronization information comprises a grandmaster clock identity of the first node;
    determining, in response to a case where the grandmaster clock identity of the first node is an identity of the second node, one of all third nodes as a preferred node according to the in-band time synchronization information, and synchronizing time of the second node with time of the preferred node; and
    determining, in response to a case where the grandmaster clock identity of the first node is not the identity of the second node, one node among the first node and all the third nodes as a preferred node according to the out-of-band time synchronization information and the in-band time synchronization information, and synchronizing the time of the second node with time of the preferred node,
    wherein the out-of-band time synchronization information further comprises a priority level 1, a priority level 2, and a hop count of the first node.

4. The method of claim 3, wherein the in-band synchronization link is a Precision Time Protocol link.

5. The method of claim 4, wherein the out-of-band synchronization link is a 1PPS+TOD synchronization link.

6. The method of claim 5, wherein after receiving the out-of-band time synchronization information sent by the first node and the in-band time synchronization information sent by the at least one third node and before determining the one node among the first node and all the third nodes as the preferred node according to the out-of-band time synchronization information and the in-band time synchronization information, the method further comprises:
    mapping the port of the second node serving as an input port of the 1PPS+TOD synchronization link to be an input port of the Precision Time Protocol link.

7. The method of claim 6, wherein mapping the port of the second node serving as the input port of the 1PPS+TOD synchronization link to be the input port of the Precision Time Protocol link comprises:
    building a 1PPS+TOD reference source data set according to the out-of-band time synchronization information, wherein a grandmaster clock identity in the 1PPS+TOD reference source data set is the grandmaster clock identity of the first node.

8. The method of claim 7, wherein
    the 1PPS+TOD reference source data set further comprises the priority level 1, the priority level 2, and the hop count of the first node.

9. A second node provided with at least one input port connected to an output port of a first node via an out-of-band synchronization link and at least one additional input port connected to a third node via an in-band synchronization link, comprising:

a receiving module configured to receive out-of-band time synchronization information sent by the first node and in-band time synchronization information sent by at least one third node, wherein the out-of-band time synchronization information comprises a grandmaster clock identity of the first node;

a first processing module configured to determine, in response to a case where the grandmaster clock identity of the first node is an identity of the second node, one of all third nodes as a preferred node according to the in-band time synchronization information, and synchronize time of the second node with time of the preferred node; and a second processing module configured to determine, in response to a case where the grandmaster clock identity of the first node is not the identity of the second node, one node among the first node and all the third nodes as a preferred node according to the out-of-band time synchronization information and the in-band time synchronization information, and synchronize the time of the second node with time of the preferred node, wherein the out-of-band time synchronization information further comprises a priority level 1, a priority level 2, and a hop count of the first node.

\* \* \* \* \*